United States Patent [19]

Nomura et al.

[11] Patent Number: 4,971,485
[45] Date of Patent: Nov. 20, 1990

[54] CEMENTED CARBIDE DRILL

[75] Inventors: Toshio Nomura; Nobuyuki Kitagawa; Kazutaka Isobe, all of Hyogo, Japan

[73] Assignee: Sumitomo Electric Industries, Ltd., Osaka, Japan

[21] Appl. No.: 470,083

[22] Filed: Jan. 25, 1990

[30] Foreign Application Priority Data

Jan. 26, 1989 [JP] Japan ................................ 1-16679
Jun. 22, 1989 [JP] Japan ................................ 1-160555

[51] Int. Cl.$^5$ ........................ B23B 27/14; B23B 51/00
[52] U.S. Cl. ................... 408/144; 76/108.6; 76/DIG 11; 407/119; 419/15
[58] Field of Search ............... 408/144; 407/119; 76/108.1, 108.6, DIG. 11; 419/13–15, 18

[56] References Cited

U.S. PATENT DOCUMENTS 4,642,003 2/1987 Yoshimura ........................ 408/144

FOREIGN PATENT DOCUMENTS

| 31507 | 3/1980 | Japan ................................ 407/119 |
| 58-143115 | 9/1983 | Japan . |
| 115103 | 7/1984 | Japan ................................ 408/144 |
| 125348 | 7/1985 | Japan ................................ 408/144 |
| 62-218010 | 9/1987 | Japan . |
| 62-46489 | 12/1987 | Japan . |
| 62-0292307 | 12/1987 | Japan . |
| 63-38501 | 2/1988 | Japan . |
| 63-38502 | 2/1988 | Japan . |

OTHER PUBLICATIONS

Hisashi Suzuki et al., Nihon Kinzoku Gakkai-shi, vol. 28, 1964, p. 55.

*Primary Examiner*—Steven C. Bishop
*Attorney, Agent, or Firm*—W. G. Fasse; D. H. Kane, Jr.

[57] ABSTRACT

A drill is formed by a hard dispersed phase of WC and a B-1 type solid solution, and a bond metal phase of an iron family metal. The composition of the hard dispersed phase is expressed as $(W_aM_b)(C_xN_y)$, where M represents Ti, or two or more metals, including Ti but excluding W, selected from the group IVa, Va and VIa of the periodic table, and a, b, x and y represents molar fractions which are defined by relational expressions of $a+b=1$, $x+y=1$, $x>0$, $y \geq 0$ and $b \geq 0.4$. The bond metal phase occupies at least 13 volume percent and not more than 30 volume percent of the cemented carbide.

8 Claims, 1 Drawing Sheet

CEMENTED CARBIDE DRILL

BACKGROUND OF THE INVENTION

1. Field of the Invention

The present invention relates to the structure of a cemented carbide drill which is mainly adapted to drill steel members, and more particularly, it relates to the structure of a high-quality cemented carbide drill which is excellent in abrasion resistance and toughness.

2. Description of the Background Art

A drill is one of cutting tools for cutting steel members or the like. FIG. 1 shows an exemplary structure of a twist drill. This twist drill is formed by a cutting edge portion 1 for drilling and a shank portion 2, which is not concerned with cutting but mounted on a chuck, etc. of a cutting machine, such as a drilling machine, for discharging chips.

In general, such a drill is made of high-speed steel or cemented carbide. The high-speed steel, which is excellent in toughness, but inferior in abrasion resistance, is not suitable for high-speed cutting. On the other hand, the cemented carbide is excellent in abrasion resistance, accuracy required for a tool etc., but inferior in rupture strength to the high-speed steel. Therefore, if the cemented carbide is employed for a machine tool having low rigidity, for example, the tool may be broken.

Further, it is indispensable to prepare a drill core, which has a slow cutting speed and a large negative rake angle, from a strong cemented carbide material, i.e., a material having inferior abrasion resistance, in order to prevent chipping of the cutting edge. Thus, it has been extremely difficult to prevent agglutinative abrasion of a rake face provided in the inner peripheral portion of the drill and abrasion of the outer peripheral portion which has a higher cutting speed.

In order to improve the drill in these points, there have been proposed a method of coating the cutting edge portion of high-speed steel with a hard TiN layer, a method of preparing the cutting edge portion from cemented carbide and brazing the same, and the like.

In recent years, there have also been proposed a technique of brazing different types of cemented carbide materials (P30 and D30) for improving abrasion resistance and toughness as disclosed in Japanese Utility Model Laying-Open No. 58-143115(1983) or metallurgically integrating/joining the materials as disclosed in Japanese Utility Model Publication No. 62-46489(1987), a double-structure drill having a core and an outer peripheral portion which are formed of different types of cemented carbide materials in consideration of different characteristics required therefor as disclosed in Japanese Patent Laying-Open No. 62-218010(1987) or a method of forming such a double-structure drill by injection molding as disclosed in Japanese Patent Laying-Open No. 63-38501(1988) or 63-38502(1988), and the like. Further, Japanese Patent Laying-Open No. 62-292307(1987) discloses a technique of forming a drill from cement, in order to improve agglutination resistance of the drill.

The cutting edge portion and the shank portion of the drill are used under different load conditions. Therefore, the respective portions of the drill must have different characteristics. For example, abrasion resistance, agglutination resistance and the like are required for the tip of the cutting edge portion, while toughness is required for the shank portion in order to maintain strength of the tool. As to the tip of the cutting edge portion, further, different characteristics are required for the core and the outer peripheral portion, which are extremely different in cutting speed from each other.

In order to satisfy such complicated requirements for the characteristics of the drill, the cutting edge portion may be coated with a hard film. Once the hard film is separated, however, the coated drill is abruptly abraded. In general, the tip of an abraded spent drill is polished for re-usage. However, when the drill is subjected to re-grinding, the coating layer is inevitably separated at least from the front flank side, to damage most of the coating effect. In this case, therefore, it is necessary to re-coat the polished portion in order to effectuate original abrasion resistance. Consequently, the cost for the tool and the burden on tool management are increased under the present circumstances. As to the technique of brazing cemented carbide to the cutting edge portion, there has been such a disadvantage that the brazing method itself is essentially inferior in thermal strength and mechanical strength and not applicable to working of an unworkable material and deep hole drilling. Further, if cemented carbide is formed from coarse particles or highly bonded phases in order to improve toughness of the shank portion of the drill as recently proposed, strength of the material is reduced or distortion of the elastic limit is lowered to break the shank portion due to vibration of workpieces or instable rotation of the cutting machine during drilling operation.

SUMMARY OF THE INVENTION

An object of the present invention is to provide a cemented carbide drill which can equal a coated drill in abrasion resistance and surpass the same in toughness.

Another object of the present invention is to provide a cemented carbide drill which comprises a cutting edge portion having excellent abrasion resistance as well as agglutination resistance and a shank portion having necessary and sufficient toughness against breaking.

A cemented carbide drill according to one aspect of the present invention is entirely formed of first cemented carbide, which is defined as follows:

The first cemented carbide consists of a first hard dispersed phase of WC and a B-1 type solid solution and a first bond metal phase of an iron family metal. The composition of the first hard dispersed phase is expressed as $(W_aM_b)(C_xN_y)$, where M represents Ti, or two or more metals, including Ti but excluding W, selected from the groups IVa, Va and VIa of the periodic table. Symbols a, b, x and y represent molar fractions, which are defined as follows:

$a+b=1$ $x+y=1$ $x>0$ $y\geq 0$ $b\geq 0.4$

The first bond metal phase occupies at least 13 volume percent and not more than 30 volume percent of the first cemented carbide.

That is, the first cemented carbide contains carbide or carbo-nitride of hard metal(s) other than W, mainly composed of Ti, by at least 0.4 in molar fraction, and a bond metal phase by at least 13 volume percent and not more than 30 volume percent.

A cemented carbide drill according to another aspect of the present invention comprises a cutting edge portion which is formed of the aforementioned first cemented carbide and a shank portion which is formed of second cemented carbide as defined below. The cutting edge portion is adapted to cut workpieces. The shank portion is to be mounted on a prescribed position of a cutting machine. In order to improve the performance of the shank portion, only the cutting edge portion is formed of the first cemented carbide. The shank portion is integrally joined with the cutting edge portion.

The second cemented carbide consists of a second hard dispersed phase of WC particles and a second bond metal phase containing Co. The second hard dispersed phase is not more than 0.7 μm in average particle size. The second bond metal phase occupies at least 13 volume percent and not more than 30 volume percent of the second cemented carbide.

A drill generally requires abrasion resistance and agglutination resistance for its cutting edge portion as well as breaking resistance which is represented by toughness of its shank portion. In the cemented carbide drill according to the present invention, the composition, particle sizes etc. are restricted for the following reasons:

FIG. 2 shows a drill which is in an abraded state. Numeral 11 denotes a portion of a rake face which has caused agglutinative abrasion in the inner peripheral portion of the drill. When the rake face is abraded by agglutination of workpieces and the drill material, the drill reaches the end of its life due to adhesion of chips.

It is well known that such agglutinative abrasion may be reduced by preparing a material for the drill so as to increase the content of carbide or carbo-nitride of (Ti-TaNb)(CN) or the like, which is mainly composed of Ti having low affinity with steel. Referring to FIG. 2, numeral 12 denotes an abraded marginal portion of the drill, and numeral 13 denotes a chipped portion in the front flank of the tip.

If the content of the aforementioned carbide or carbo-nitride is simply increased, however, strength of the drill is inevitably reduced to significantly damage its practicability.

The inventors have found that it is possible to increase the content of the carbide or carbo-nitride for improving agglutinative abrasion resistance without reducing strength of the drill by preparing the carbide or carbo-nitride from fine particles and increasing the content of the bond metal. The present invention has been proposed on the basis of such recognition.

The first cemented carbide according to the present invention is not applicable to the edge of a cutting tool of cutter having a high cutting speed, due to the possibility of plastic deformation of the tip or crater abrasion of the rake face. When this cemented carbide is applied to the cutting edge portion of a drill, however, it exhibits astonishing performance in such drilling operation that the tool life is dominated by agglutinative adhesion in a low-speed core region with a marginal cutting speed of 100 m/min. at the most.

In the composition of the first hard dispersed phase which is expressed as $(W_aM_b)(C_xN_y)$, the molar fraction of the carbide or carbo-nitride of Ti, or two more metals, including Ti but excluding W, selected from the groups IVa, Va and VIa of the periodic table, i.e., the molar fraction of M, is suitably 0.4 or more with respect to the overall first hard dispersed phase. If the molar fraction of M is less than 0.4, sufficient agglutinative abrasion resistance cannot be attained.

The average particle size of the first hard dispersed phase is preferably not more than 1.5 μm and the content of the first bond metal phase is at least 13 volume percent and not more than 30 volume percent, since sufficient strength for the drill cannot be attained if the average particle size of the first hard dispersed phase exceeds 1.5 μm and the content of the first bond metal phase is less than 13 volume percent. If the content of the first bond metal phase exceeds 30 volume percent, on the other hand, plastic deformation of the tip is undesirably caused during cutting operation.

In general, it is extremely difficult to measure the average particle size of WC and the B-1 type solid solution forming the aforementioned first hard dispersed phase through the Fullman equation or the like in a structure observed with a microscope.

It is well known that coercive force of cemented carbide can be regarded as a particle size parameter if the composition and the amount of the bond metal phase are constant (Hisashi Suzuki et al., Nihon Kinzoku Gakkai-shi, vol. 28, 1964, p. 55). When the first bond metal is prepared from Co to provide three-phase cemented carbide of WC, B-1 type solid solution and Co, the effect of the present invention is further excellently provoked if the content of Co is within a range of 13 to 30 volume percent and coercive force is at least 1300 Oe (oersteds).

It is also preferable to add nitrogen to the inventive cemented carbide, in order to suppress grain growth of hard dispersed particles during sintering.

A cemented carbide drill according to another aspect of the present invention comprises a shank portion which is formed of WC cemented carbide containing WC particles of not more than 0.7 μm in average particle size as a hard dispersed phase. If the shank portion is formed of high-speed steel or the like, cracking is easily caused due to difference in thermal expansion coefficient between the material therefor and the cemented carbide forming the cutting edge portion. Further, the high-speed steel, whose Young's modulus is about ⅓ of that of WC cemented carbide, is inferior in vibration resistance in cutting and promotes abrasion and breaking of the cutting edge portion.

If the average particle size of the hard dispersed phase exceeds 0.7 μm, the shank portion cannot attain sufficient strength against breaking. On the other hand, toughness is reduced if the content of the bond metal phase is less than 13 volume percent, while plastic deformation is caused if the said content exceeds 30 volume percent.

According to the present invention, as hereinabove described, abrasion resistance and toughness of the cemented carbide drill are extremely improved to enable efficient drilling with no requirement for a coated drill.

According to the present invention, the cutting edge portion is formed of cemented carbide which is excellent in abrasion resistance, agglutination resistance and thermal cracking resistance (chipping resistance) while the shank portion is formed of WC cemented carbide having sufficient toughness, and these portions are integrally joined with each other to form the drill. Thus, the present invention can provide a cemented carbide drill which has high reliability, long life and high quality, with no unexpected occurrence of breaking etc.

These and other objects, features, aspects and advantages of the present invention will become more apparent from the following detailed description of the present invention when taken in conjunction with the accompanying drawings.

DESCRIPTION OF THE PREFERRED EMBODIMENTS

The present invention is now described in detail with reference to Examples.

EXAMPLE 1

Samples were prepared by blending commercially available WC powder of 0.8 μm, Co powder of 1.0 μm, (TiW)C powder of 1.0 μm, TaC powder of 1.0 μm and NbC powder of 1.0 μm in average particle size with contents of bond metals, molar fractions of carbide excluding that of W and average particle sizes of hard dispersed phases shown in Table 1, mixing the materials in a wet type ball mill for 10 hours, drying and hydrostatically pressing the same with a pressure of 1 ton/cm².

The obtained compacts were thereafter sintered to prepare samples of cemented carbide materials. The respective samples were ground to obtain drills of 10 mmφ.

Ti, Ta and Nb were in the ratios 8:1:1 in molar fraction.

Referring to Table 1, the inventive samples are shown with marks *.

Table 1 also shows reference examples, which were prepared in a similar manner with changes in the grain sizes and blending ratios of raw materials.

TABLE 1

| Sample No. | Bond Metal (vol. %) | Molar Fraction of Carbide Excluding W | Average Particle Size of Hard Phase (μm) | Coercive Force (Oe) |
|---|---|---|---|---|
| 1 | 10 | 0.62 | 2.5 | 160 |
| 2 | 12 | 0.62 | 2.5 | 140 |
| 3 | 15 | 0.62 | 2.5 | 80 |
| 4* | 15 | 0.45 | 1.2 | 250 |
| 5 | 19 | 0.28 | 0.8 | 250 |
| 6 | 19 | 0.35 | 1.0 | 200 |
| 7* | 19 | 0.55 | 1.4 | 160 |
| 8 | 12 | 0.38 | 2.0 | 190 |
| 9 | 20 | 0.05 | 0.7 | 330 |

The drills of the inventive samples and reference examples were subjected to drilling tests under the following cutting conditions:
Workpiece: S50C
Cutting Speed: 65 m/min.
Feed Rate: 0.25 mm/rev.
Depth of Cut: 18 mm
Cutting Oil: water-soluble type
Number of Drilled Holes: 1000

Table 2 shows the results.

Referring to Table 2, the reference example No. 10 was prepared by coating the drill of No. 9 with a TiN layer of 4 μm in thickness through a PVD process.

TABLE 2

| Sample No. | Abrasion Loss of Marginal Edge (mm) | Depth of Agglutinative Abrasion of Inner Periphery (mm) | Chipping of Edge |
|---|---|---|---|
| 1 | tip broken with 720 holes test stopped | | |
| 2 | 0.12 | 0.02 | extremely chipped |
| 3 | 0.13 | 0.03 | middlingly chipped |
| 4* | 0.12 | 0.04 | unchipped |
| 5 | 0.21 | 0.11 | unchipped |
| 6 | 0.18 | 0.08 | unchipped |
| 7* | 0.12 | 0.03 | unchipped |
| 8 | 0.18 | 0.10 | slightly chipped |
| 9 | extremely abraded with 270 holes test stopped | | |
| 10 | 0.10 | 0.06 | slightly chipped |

As understood from Table 2, it has been recognized that the cemented carbide drill according to the present invention is excellent in abrasion resistance, particularly in agglutinative abrasion resistance at the inner periphery, while its tip has excellent chipping resistance.

Figure 1:
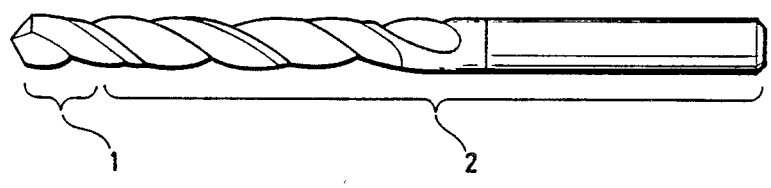
FIG. 1 is a structural diagram showing a general twist drill.
Figure 2:
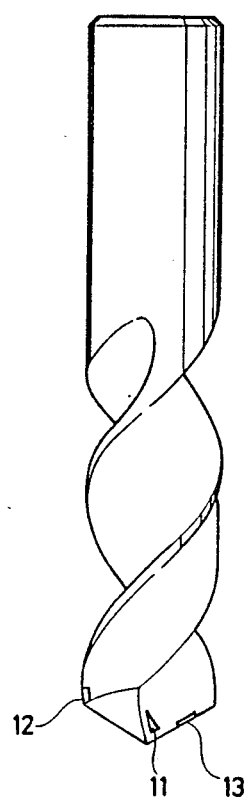
FIG. 2 illustrates typical damaged portions of a drill.

Referring to Table 2, "abrasion loss of marginal edge", "depth of agglutinative abrasion of inner periphery" and "chipping of tip" are representative of values relating to the portions 12, 11 and 13 shown in FIG. 2.

EXAMPLE 2

Samples of cemented carbide listed in Table 3 were prepared similarly to Example 1, except for that (TiW)C was replaced by (TiW)(CN), to produce drills of 10 mmφ.

TABLE 3

| Sample No. | Bond Metal (vol. %) | Molar Fraction of Carbo-nitride Excluding W | Average Particle Size of Hard Phase (μm) | Coercive Force (Oe) | Nitrogen Content (Mole Ratio) N/C + N |
|---|---|---|---|---|---|
| 11* | 18 | 0.45 | 1.2 | 200 | 0 |
| 12* | 18 | 0.45 | 1.0 | 230 | 0.05 |
| 13* | 18 | 0.45 | 0.7 | 250 | 0.10 |

As understood from Table 3, it has been recognized that average particle sizes of hard phases were reduced by addition of nitrogen.

Table 4 shows the results of drilling tests made with the aforementioned drills under cutting conditions similar to those of Example 1. It has been recognized that abrasion resistance is improved with reduction in average particle size of the hard phase. Thus, the cemented carbide according to the present invention is excellent as a material for a drill.

TABLE 4

| Sample No. | Abrasion Loss of Marginal Edge (mm) | Depth of Agglutinative Abrasion of Inner Periphery (mm) | Chipping of Edge |
|---|---|---|---|
| 11* | 0.13 | 0.02 | None |
| 12* | 0.12 | 0.02 | None |
| 13 | 0.10 | 0.01 | None |

EXAMPLE 3

Cemented carbide powder materials for cutting edge portions were prepared by mixing commercially available WC powder of 0.8 μm, Co powder of 1.0 μm, (TiW)C powder of 1.0 μm, TaC powder of 1.0 μm and NbC powder of 1.0 μm in average particle size so that contents (vol. %) of bond metals, molar fractions of carbide excluding W and average particle sizes (μm) of hard phases were at values shown in Table 5 after sintering.

composition, the particle size etc. of the cutting edge portions were out of the scope of the present invention, as shown by marks *. The reference examples F and G were prepared so that the composition and particle size of the cemented carbide materials forming the shank portions were out of the scope of the present invention. Further, the reference example H was prepared so that both of the materials for the cutting edge portion and the shank portion were out of the scope of the present invention. The marks * show the values which are out of the scope of the present invention.

TABLE 5

|  |  | Cutting Edge Portion | | | | Shank Portion | |
| --- | --- | --- | --- | --- | --- | --- | --- |
|  | Sample | Bond Metal (vol. %) | Molar Fraction of Carbide Excluding W | Average Particle Size of Hard Phase (μm) | Coercive Force (Oe) | Bond Metal (vol. %) | Average Particle Size of Hard Phase (μm) |
| Example | A | 15 | 0.55 | 1.2 | 230 | 23 | 0.6 |
|  | B | 19 | 0.60 | 1.0 | 175 | 18 | 0.5 |
|  | C | 22 | 0.48 | 1.0 | 155 | 15 | 0.5 |
| Reference | D | 12* | 0.60 | 2.4* | 140 | 18 | 0.5 |
| Example | E | 19 | 0.35* | 1.0 | 205 | 15 | 0.5 |
|  | F | 18 | 0.55 | 1.0 | 185 | 12* | 0.6 |
|  | G | 22 | 0.46 | 1.2 | 150 | 18 | 1.2* |
|  | H | 18 | 0.42 | 2.2* | 115* | 18 | 1.0* |

Cemented carbide powder materials for shank portions were prepared by mixing WC powder and Co powder of 0.5 μm in average particle size so that contents (vol. %) of bond metals and average particle sizes (μm) of hard phases were at values shown in Table 5 after sintering. Small amounts of VC powder materials were blended as components for suppressing grain growth.

The cemented carbide powder materials for cutting edge portions were joined with those for shank portions in steps of forming/pressing the pulverulent bodies. In more concrete terms, these cemented carbide powder materials were joined with each other by the so-called CIP (cold isostatic pressing) process with a hydrostatic press before sintering. The obtained compacts were thereafter sintered to prepare samples of cemented carbide materials. The respective samples were ground to obtain drills of 10 mmφ.

Reference examples were prepared similarly to the above, with changes in the particle sizes and compounding ratios of powder materials as shown in Table 5, to prepare drills of 10 mmφ.

Table 5 shows values of composition, particle size distribution etc. of the drills of the inventive samples and the reference examples. Referring to Table 5, the reference examples D and E were prepared so that the These drills were subjected to performance evaluation tests under the following conditions:

Workpiece: S50C ($H_B$=230)

Cutting Speed: 60 m/min., dry type (with water-soluble cutting oil)

Feed Rate: 0.25 mm/rev.

Depth of Cut: 25 mm

Criterion: worked to end of life for observation of tip condition etc.

Life: generally assumed to end when abrasion loss of marginal front flank exceeded 0.2 mm Table 6 shows the results of the aforementioned performance evaluation tests. Referring to Table 6, no sufficient strength was attained in the reference example D, whose tip was chipped, while the reference example E was inferior in agglutinative abrasion resistance as compared with the inventive samples A to C.

The reference examples F to H, whose shank portions were broken, were inferior in shank strength to the inventive samples A to C.

For the purpose of information, the same performance evaluation tests were made on drills of currently used materials of coated high-speed steel and coated cemented carbide. It is obvious that the inventive drills A to C are superior to these drills.

TABLE 6

|  | Sample | Number of Drilled Holes | Abrasion Loss of Marginal Front Flank (mm) | Depth of Agglutinative Abrasion of Inner Rake Face (mm) |
| --- | --- | --- | --- | --- |
| Example | A | 1550 | 0.2 | 0.02 |
|  | B | 1440 | 0.2 | 0.01 |
|  | C | 1620 | 0.2 | 0.02 |
| Reference | D | 515 | test stopped due to tip chipping | |
| Example | E | 725 | 0.2 | 0.11 |
|  | F | 420 | test stopped due to breaking of shank portion | |
|  | G | 870 | | |
|  | H | 240 | | |
| Information | Coated High-Speed Steel | 84 | test stopped due to tip chipping | |
|  | Coated Cemented Carbide (Single | 1040 | test stopped due to abrupt breaking of shank portion | |

TABLE 6-continued

| Sample | Number of Drilled Holes | Abrasion Loss of Marginal Front Flank (mm) | Depth of Agglutinative Abrasion of Inner Rake Face (mm) |
| --- | --- | --- | --- |
| Material) Coated Cemented Carbide (Tip Only) | 1540 | 0.2 | 0.12 |

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. A cemented carbide drill formed by a hard dispersed phase consisting of WC and a B-1 type solid solution and a bond metal phase of an iron family metal, said hard dispersed phase being composed of $(W_aM_b)(C_xN_y)$, where M represents Ti, or two or more metals, including Ti but excluding W, selected from the groups IVa, Va and VIa of the periodic table, and a, b, x and y represent such molar fractions that $a+b=1$, $x+y=1$, $x>0$, $y\geq 0$ and $b\geq 0.4$, said bond metal phase occupying at least 13 volume percent and not more than 30 volume percent of said cemented carbide.

2. The cemented carbide drill in accordance with claim 1, wherein said hard dispersed phase is not more than 1.5 μm in average particle size.

3. The cemented carbide drill in accordance with claim 1, wherein said bond metal phase is composed of Co and unavoidable impurities, and coercive force of said cemented carbide is at least 130 Oe.

4. The cemented carbide drill in accordance with claim 1, wherein said M represents Ti, Ta and Nb.

5. A cemented carbide drill comprising a cutting edge portion for cutting workpieces and a shank portion to be mounted on a prescribed position of a cutting machine, said cutting edge portion being prepared from first cemented carbide consisting of a first hard dispersed phase of WC and a B-1 type solid solution and a first bond metal phase of an iron family metal, said first hard dispersed phase being composed of $(W_aM_b)(C_xN_y)$, where M represents Ti, or two or more metals, including Ti but excluding W, selected from the group IVa, Va and VIa of the periodic table, and a, b, x and y represent such molar fractions that $a+b=1$, $x+y=1$, $x>0$, $y\geq 0$ and $b\geq 0.4$, said first bond metal phase occupying at least 13 volume percent and not more than 30 volume percent of said first cemented carbide, said shank portion being integrally joined with said cutting edge portion and prepared from second cemented carbide consisting of a second hard dispersed phase of WC particles and a second bond metal phase containing Co, said second hard dispersed phase being not more than 0.7 μm in average particle size, said second bond metal phase occupying at least 13 volume percent and not more than 30 volume percent of said second cemented carbide.

6. The cemented carbide drill in accordance with claim 5, wherein said first hard dispersed phase is not more than 1.5 μm in average particle size.

7. The cemented carbide drill in accordance with claim 5, wherein said first bond metal phase is composed of Co and unavoidable impurities, and coercive force of said first cemented carbide is at least 130 Oe.

8. The cemented carbide drill in accordance with claim 5, wherein said M represents Ti, Ta and Nb.

* * * * *

UNITED STATES PATENT AND TRADEMARK OFFICE
CERTIFICATE OF CORRECTION

PATENT NO. : 4,971,485
DATED : November 20, 1990
INVENTOR(S) : Nomura et al.

It is certified that error appears in the above-identified patent and that said Letters Patent is hereby corrected as shown below:

In [57] Abstract, line 6, replace "from the group" by
--from the groups--;

In the Specification, Column 4, line 31, replace "1300 Oe" by --130 Oe--.

Signed and Sealed this

Twenty-third Day of June, 1992

Attest:

DOUGLAS B. COMER

*Attesting Officer*　　　*Acting Commissioner of Patents and Trademarks*